3,291,775
PROCESS FOR CURING POLYEPOXIDES
WITH A POLYIMINE
Roy T. Holm, Orinda, Calif., assignor to Shell Oil Company, New York, N.Y., a corporation of Delaware
No Drawing. Filed Nov. 13, 1961, Ser. No. 152,032
14 Claims. (Cl. 260—47)

This invention relates to a process for curing polyepoxides. more particularly, the invention relates to a new process for curing polyepoxides using a special type of latent curing agent, and to the useful products obtained therefrom.

Specifically, the invention provides a new process for curing and resinifying polyepoxides, and preferably glycidyl polyethers of polyhydric phenols or polyhydric alcohols, which comprises mixing the polyepoxide with certain polyimines as described hereinafter and exposing the resulting mixture to a moist atmosphere. The invention further provides hard resinous products obtained by the above-described process.

This application is a continuation-in-part of application Serial No. 784,042, filed December 31, 1958 now abandoned.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have a drawback that greatly limits the industrial use of the polyepoxides. The known mixtures comprising the polyepoxide and curing agent set up rather rapidly, and this is true even though the mixtures are stored in air tight containers away from moisture and air and even though the temperature is maintained quite low. This difficulty necessitates a mixing of the components just before use and a rapid use of the material before cure sets in. Such a procedure places a considerable burden on the individual operators, and in many cases, gives inferior products resulting from inefficient mixing and too rapid operations.

It is an object of the invention, therefore, to provide a new class of latent curing agents for polyepoxides. It is a further object to provide new curing agents for polyepoxides that are substantially unreactive with polyepoxides when stored under atmospheres substantially free of moisture. It is a further object to provide new curing agents that can be premixed with the polyepoxides and the mixture stored or shipped without danger of premature gelation. It is a further object to provide new compositions containing polyepoxides that undergo cure only when in contact with moisture. It is a further object to provide a new process for curing polyepoxides that is particularly useful for the preparation of surface coatings. It is a further object to provide new curing agents for polyepoxides that may be cured to prepare high solids or solvent free coatings. These and other objects of the invention will be apparent from the following detailed description thereof.

It has now been discovered that these and other objects may be accomplished by the new process of the invention comprising mixing the polyepoxide, and preferably a glycidyl polyether of a polyhydric phenol or polyhydric alcohol, with polyimines as described hereinafter and exposing the resulting mixture to a moist atmosphere. It has been surprisingly found that the polyimines are inactive toward the polyepoxides when combined together in the absence of moisture, but when the mixture is spread out and exposed to moist atmosphere, the compositions unexpectedly set up to form hard cured films. These new curing agents thus provide a means for premixing the curing agent and polyepoxide and shipping or storing the mixture in the absence of moisture without danger of premature gelation. This advantage not only results in a more thorough mixing, but also a reduction in cost to the consumer. This also permits the preparation of solvent free sprayable composition as noted hereinafter.

The materials used as curing agents according to the present invention comprise the polyimines such as, for example, those obtained by reacting ketones or aldehydes with polyamines or alternatively by reacting polyketones or polyaldehydes with monoamines.

Preferred members are those obtained by reacting polyamines with ketones, or aldehydes, such as those of the formula

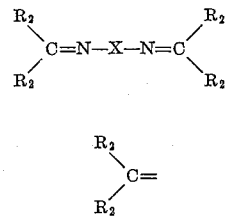

wherein

is the residue obtained from a monoketone or monoaldehyde by removing the ketone or aldehyde oxygen atom, and =N—X—N= is the residue from a polyamine obtained by removing the two hydrogens from terminal primary amine groups.

The ketones noted above may be aliphatic, cycloaliphatic, heterocyclic or aromatic and saturated or unsaturated. They may also be substituted with other groups, such as ester, acid OH, alkoxy and halogen atoms. The preferred ketones contain from 3 to 25 carbon atoms. Examples of the ketones include, among others, methyl ethyl ketone, dimethyl ketone, diethyl ketone, methyl isobutyl ketone, dibutyl ketone, diisobutyl ketone, methyl isopropyl ketone, methyl octyl ketone, ethyl butyl ketone, methyl phenyl ketone, cyclohexanone, dioctyl ketone, cyclohexyl methyl ketone, chloroallyl methyl ketone, methoxymethyl butyl ketone, cyclohexenyl allyl ketone, levulinic acid, methyl levulinate, butyl levulinate, beta-hydroxybutyl methyl ketone, didodecyl ketone, dioctadecyl ketone, methyl decyl ketone, and the like.

The aldehydes noted above may be aliphatic, cycloaliphatic, heterocyclic or aromatic and saturated or unsaturated. They may also be substituted with other groups, such as ester, acid, OH, ether and halogen atoms or groups. Preferred aldehydes contain from 2 to 25 carbon atoms. Examples of these aldehydes include, among others, acetaldehyde, propionaldehyde, chloropropionaldehyde, butyraldehyde, isobutyraldehyde, valeroaldehyde, caproic aldehyde, heptoic aldehyde, methacrolein, nicotinaldehyde, cinchoninaldehyde, 2-pyrancarboxaldehyde, tetrahydropyran-2-carboxaldehyde, 2-furaldehyde, crotonaldehyde, acrolein, benzaldehyde, 1 - naphthaldehyde, durene dialdehyde, glutaraldehyde, 1-cyclohexene-1-carboxaldehyde, 1-cyclopentene - 1 - carboxaldehyde and 2,4-heptadiene-1-carboxyaldehyde. Preferred aldehydes to be used include the aliphatic, cycloaliphatic and aromatic mono- and dialdehydes containing from 2 to 20 carbon atoms and still more preferably from 2 to 20 carbon atoms and still more preferably from 2 to 12 carbon atoms.

The polyamines used in the above-noted process are those which possess at least two primary amine groups and preferably not more than 6 amino nitrogen. They may be aliphatic, cycloaliphatic, heterocyclic and aromatic and may be saturated or unsaturated. They may also be substituted with various substituents, such as ester groups, urethane groups, OH groups, thio groups, ether groups and the like. Examples of these amines include, among others, ethylene diamine, diethylene triamine, pentamethylene diamine, hexamethylene diamine, butylene diamine, xylylene diamine, phenylene diamine, diaminodiphenylsulfone, methylenedianiline, triaminobenzene, 2,3-diaminotoluene, 2,2'-diaminodiphenyl, 1,3-diamino-4-isopropylbenzene, 1,3-diamino-4,5 - diethylbenzene, diaminostilbene, triethylene tetramine, tetraethylene pentamine, diaminopyridine, N,N-diethyl-1,3-propanediamine, 1,10-decanediamine, 1,4-diaminocyclohexane, 1,3-diaminocyclopentane, 1,4-diamino-2-cyclohexene, 1,18-octadecanediamine, and the like, and mixtures thereof.

Other preferred polyamines that may be used include those which are obtained by coupling two or more of the above-noted amines together say by reaction with acids to form polyamides, reaction with isocyanates to form polyurethanes, and reaction with polyepoxides to form hydroxypolyamines. Also included are those polyamines formed by reacting a hydroxymonoamine with an acid or anhydride, or by reacting an unsaturated amine, such as allylamine with hydrogen sulfide, polymercaptans, phosphorous trichloride and the like.

Examples of polycarboxylic acids or anhydrides that may be reacted with the above-noted polyamines or hydroxyamines to form new polyamines for use in the preparation of the polyimines include, among others, the aliphatic, cycloaliphatic, aromatic and heterocyclic polycarboxylic acids or anhydrides, such as, for example, dimerized and trimerized unsaturated fatty acids, such as linoleic acids and the like, phthalic anhydride, terephthalic anhydride, adipic acid, sebacic acid, trimellitic anhydride, pyromellitic anhydride, chlorophthalic anhydride, tetrahydrophthalic anhydride, methoxytetrahydrophthalic anhydride, and the like.

Examples of the isocyanates that may be reacted with the above-described polyamines to form new polyamines include, among others hexamethylene diisocyanate, toluene diisocyanate, pentamethylene diisocyanate, durene diisocyanate, cyclohexane diisocyanate, cyclopentene diisocyanate, dodecane diisocyanate, and the like. Especially preferred are the aliphatic, cycloaliphatic and aromatic diisocyanates.

Examples of the polyepoxides that may be used in reacting with the polyamines to form new polyamines useful in preparing the polyimines include any of these described hereinafter as to the materials to be cured by the polyimines. Especially preferred are the aliphatic, cycloaliphatic and aromatic diepoxides containing up to 30 carbon atoms.

Examples of the unsaturated monoamines used in the reaction with the hydrogen sulfide, mercaptans and phosphorous trichloride to obtain new polyamines include, among others, allyl amine, butenyl amine, cyclohexenylamine and the like. Especially preferred is allylamine. The mercaptans to be used include, among others, 1,3-propanedithiol, 1,4-butanedithiol, 1,5 - pentanedithiol, 1,4-cyclohexanedithiol, 1,4-benzenedithiol and the like. Especially preferred are the alkanedithiols, cycloalkanedithiols and the aromatic dithiols, particularly those containing up to 18 carbon atoms.

Other preferred polyimines are those preferably prepared by reacting polyketones or polyaldehydes with monoamines, such as those of the formula

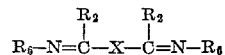

wherein $R_6$ is the residue obtained from the monoamine by removing the amino group, and

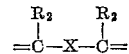

is the residue from the polyaldehyde or polyketone by removing the ketone or aldehyde oxygen atoms.

The polyketones and polyaldehydes noted above may be aliphatic, cycloaliphatic, heterocyclic or aromatic and may be saturated or unsaturated. They may also be substituted with other groups, such as ester, acid, OH, alkoxy and halogen atoms or groups. Examples of these include, among others, 1,4-butanedicarboxaldehyde,
1,5-pentanedicarboxaldehyde,
decanedicarboxaldehyde,
1,18-octadecanedicarboxaldehyde,
1,4-cyclohexanedicarboxaldehyde,
1-cyclohexene-2,5-dicarboxaldehyde,
2,7-naphthalenedicarboxaldehyde,
1,4-benzenedicarboxaldehyde,
1,6-hexanedicarboxaldehyde,
hydroxyadipaldehyde, and the like, and
2,4-octanedione,
2,4-pentanedione,
2,6-dodecanedione,
2,5-hexanedione,
1,4-cyclohexanedione,
1,3-cyclopentanedione,
1,4-cyclohexenedione,
3,6-octadecanedione,
3,8-dodecanedione and the like.

Preferred aldehydes and ketones are the dialdehydes and diketones containing up to 18 carbon atoms.

The monoamines used in making the above-noted polyimines may also be aliphatic, cycloaliphatic, heterocyclic and aromatic and may be saturated or unsaturated. They may also be substituted with other groups, such as ester, acid, OH, alkoxy and halogen atoms or groups. Examples of these include, among others, methyl amine, butyl amine, propylamine, hexylamine, dodecylamine, tetradecylamine, allylamine, butenylamine, octadecylamine, octadecenylamine, cyclohexylamine, cyclohexenylamine, cyclopentenylamine, isopropylcyclohexylamine, tert-butylbenzylamine, phenylamine, and the like.

Particularly preferred polyimines to be used in the curing process include compounds of the formula ( ) 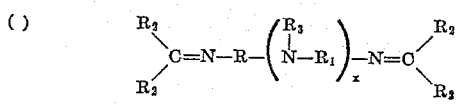

wherein $x$ is an integer including 0 and preferably 0 to 4, R and $R_1$ are bivalent hydrocarbon radicals, $R_2$ is a member of the group consisting of hydrogen, open-chain hydrocarbon radicals and cyclic hydrocarbon radicals including those cyclic radicals formed by joining together two of the $R_2$ radicals which are attached to the same carbon atom, carboxy-substituted hydrocarbon radicals, carbalkoxy-substituted hydrocarbon radicals, hydroxy-substituted hydrocarbon radicals, alkoxy-substituted hydrocarbon radicals, and halogen-substituted hydrocarbon radicals, and $R_3$ is a member of the group consisting of hydrogen, hydrocarbon radicals and

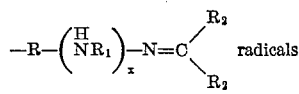 radicals

Compounds of the formula (2)
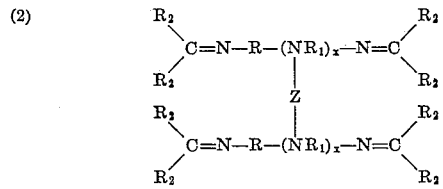

wherein $x$ is an integer of at least 1 and preferably 1 to 4, $Z$ is a bivalent hydrocarbon radical, and $R$, $R_1$ and $R_2$ are as described in (1) above;

Compounds of the formula (3)
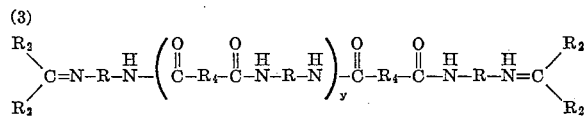

wherein $y$ is an integer including 0 and preferably 0 to 4, $R_4$ is the residue of a polycarboxylic acid by removing the two carboxyl groups and preferably a hydrocarbon radical, $R$ and $R_2$ being as described in (1) above;

Compounds of the formula (4)
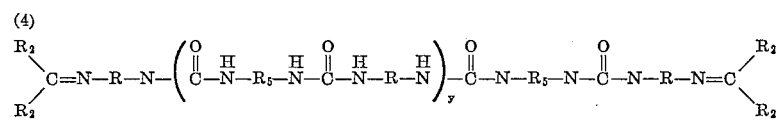

wherein $y$ is an integer including 0 and preferably 0 to 4, $R_5$ is the residue of a polyisocyanate obtained by removing the two isocyanate groups and preferably a hydrocarbon radical, $R$ and $R$ are described in (1) above;

Compounds of the formula (5)
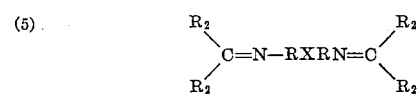

wherein $X$ is a member of the group consisting of oxygen, sulfur and phosphorous and $R$ and $R_2$ are as described above;

Compounds of the formula (6)
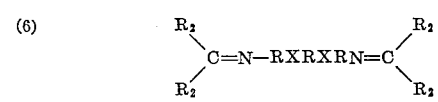

wherein $X$ is a member of the group consisting of oxygen, sulfur and phosphorous, and $R$ and $R_2$ are as described above; and Compounds of the formula (7)
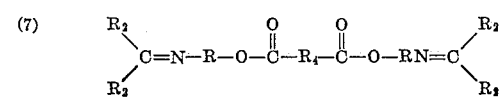

wherein $R$, $R_2$ and $R_4$ are as described above.

In the above-described formulae, $R$, $R_1$, $R_3$, $R_4$ and $R_5$ may be hydrocarbon radicals, and preferably aliphatic, cycloaliphatic or aromatic radicals. The radicals represented by $R_2$ may be exemplified by monovalent radicals, such as methyl, ethyl, propyl, butyl, isobutyl, amyl, decyl, dodecyl, octadecyl, tetradecyl, eicosanyl, allyl, vinyl, butenyl, cyclohexyl, cyclopentyl, cyclobutyl, cyclohexenyl, cyclopentyl, octadecadienyl, phenyl, benzyl, naphthyl, tert-butylphenyl, and the like. Preferred radicals are those containing from 1 to 18 carbon atoms, and still more preferably 1 to 10 carbon atoms. The radicals represented by $R$, $R_1$, $R_3$, $R_4$ and $R_5$ may be exemplified by bivalent radicals such as methylene, ethylene, propylene, butylene, dodecylene, tetradecylene, allylene, butenylene, cyclohexylene, cyclobutylene, phenylene, tert-butylphenylene and the like. Preferred radicals of this type contain from 1 to 18 carbon atoms, and still more preferably from 1 to 10 carbon atoms.

Examples of the polyimines include, among others,

N,N'-di(2-propylidene) 1,5-pentanediamine,
N,N'-di(1-propylidene) 1,6-hexanediamine,
N,N'-di(2-propylidene) 3-aza-1,5-pentanediamine,
N,N'-di(2-butylidene) 1,4-cyclohexanediamine,
N,N'-di(2-butylidene) 3,6-aza-1,8-octanediamine,
N,N'-di(1-butylidene) 1,8-octanediamine,
N,N'-di(2-propylidene) 1,4-benzenediamine,
N,N'-di(2-propylidene) 2,2-bis(4-aminophenyl)propane,
N,N'-di(2-butylidene) 2,2-bis(4-aminophenyl) sulfone,
N,N'-di(2-butylidene) 2,2-bis(4-aminophenyl)methane,
N,N'-di(4-methoxy-2-hexylidene) 2,2-bis(4-aminophenyl)propane,
N,N'-di(4-chloro-2-hexylidene) 2,2-bis(4-aminophenyl)propane,
N,N'-di(4-chloro-2-hexylidene) 2,2-bis(4-aminophenyl)propane,
N,N'-di(4-chloro-2-hexylidene) 1,5-pentanediamine,
N,N'-di(2-methoxy-4-hexylidene) 1,5-pentanediamine,
N,N'-di(3-allyl-6-octylidene) 1,5-pentanediamine,
N,N'-dioctyl 1,5-pentanediamine,
N,N'-diphenyl 1,6-octanediimine,
N,N'-dioctyl 1,4-cyclohexanediimine,
N,N'-diallyl 1,5-pentanediimine,
N,N'-dipropyl 3-aza-1,5-pentanediimine
N,N'-dicyclohexyl 3,6-diaza-1,8-octanediimine,
N,N'-dioctyl 3-aza-1,5-pentanediimine,
N,N'-diallyl 1,4-benzenediimine,
N,N'-dioctyl 2,2-bis(4-iminophenyl)propane,

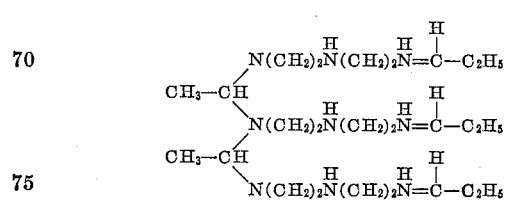

N,N'-disalicylidene phenylenediamine
N,N'-disalicylidene-1,2-propylenediamine
N,N'-dibenzylidene ethylene diamine

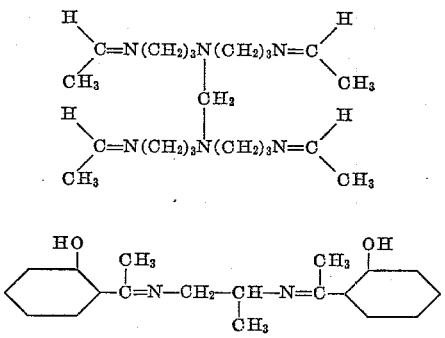

N,N'-di(2-carbethoxy-4-hexylidene) 1,5-pentanediamine
N,N'-di(2-butoxy-4-hexylidene) 1,6-hexanediamine
N,N'-di(1-chloro-2-butylidene) 1,5-pentanediamine
N,N'-di(1-hydroxy-4-octylidene) 1,6-hexanediamine
N,N'-di(2-carbethoxy-4-dodecylidene) 1,8-octanediamine
N,N'-di(butoxy-4-hexylidene) 4-thiahexane-1,6-diamine
N,N'-di(4-hexylidene) 2,4-dithiaoctane-1,8-diamine
N,N'-di(5-octylidene) 4-oxahexane-1,6-diamine
N,N'-di(5-dodecylidene) 2,4-diazaoctane-1,8-diamine
N,N'-di(2-propylidene) 2,4-dioxaoctane-1,8-diamine
N,N'-di(3-butylidene) 2,4,8,10-tetraazoctadecane-1,18-diamine
Ketimine of an amino-terminated polyamide of dimerized linoleic acid and ethylene diamine, and methyl isobutyl ketone
Ketimine of an amino-terminated polyamide of phthalic acid and 1,6-hexanediamine and methyl isobutyl ketone
Ketimine of an amino-terminated polyamide of dimerized linoleic acid and diethylene triamine, and methyl ethyl ketone
Ketimine of an amino-terminated polyamide of tetrahydrophthalic acid and 1,4-butanediamine, and diisobutyl ketone
Ketimine of an amino-terminated polyurethane of toluene diisocyanate and 1,6-hexanediamine, and methyl isobutyl ketone
Ketimine of an amino-terminated polyurethane of toluene diisocyanate and 1,8-octanediamine and diamyl ketone
Ketimine of an amino-terminated polyester of aminoethanol and dimerized linoleic acid and methyl octyl ketone
Ketimine of an amino-terminated polyester of aminoethanol and isophthalic acid and methyl isobutyl ketone
Ketimine of an amino-terminated polyurethane of durene diisocyanate and diethylene triamine, and isobutyl octyl ketone.
2,6-diaza-3,5-dibutyl-2,5-heptadiene
2,7-diaza-3,6-diallyl-2,6-octadiene
2,6-diaza-2,5-diethyl-2,5-heptadiene
4,8-diaza-5,7-diethyl-4,7-hexidecadiene
2,6-diaza-3,5-dioctyl 2,5-dodecadiene
3,8-diaza-4,7-diphenyl-3,7-decadiene
3,8-diaza-4,7-dibenzyl-3,7-tetradecadiene
2,6-diaza-3,5-dicyclohexyl-2,5-heptadiene
3,9-diaza-6-thia-4,8-dibutyl 3,8-tetradecadiene
N,N'-di(4-hexylidene) di(aminophenyl)sulfone
N,N'-di(5-octylidene) di(aminophenyl)methane.

The imines may be prepared by methods disclosed in U.S. 2,533,723, U.S. 2,692,284, U.S. 2,765,340 and U.S. 2,692,283.

The preparation of the polyimine from ethylene diamine and methyl isobutyl ketone is illustrated by the following:

1 mole of ethylene diamine was combined with 4 mols of methyl isobutyl ketone. This mixture was refluxed under phase separator. The water that separated was removed. When the theoretical amount of water had been recovered, the reaction was stopped. The excess methyl isobutyl ketone was distilled off. Analysis indicated the resulting product was made up of about 85% of N,N'-di(4-methyl-2-pentylidene) 1,2-ethane diamine and about 15% of a mixed imine wherein the methyl isobutyl ketone is attached through an imine linkage at one nitrogen atom and a C₁₂ unsaturated ketone obtained by dimerizing the methyl isobutyl ketone is attached through an imine linkage at the other nitrogen atom. The resulting bottoms product had a viscosity of 8–11 centipoises at 25° C., a flash point of 175° F. and an equivalent weight of 52. This product will be referred to as Ketimine A.

The preparation of the polyimine from diethylene triamine and methyl isobutyl ketone is illustrated by the following:

1 mole of diethylene triamine was combined with 4 moles of methyl isobutyl ketone. This mixture was refluxed under a phase separator. The water that separated was removed. When the theoretical amount of water had been recovered, the reaction was stopped. The excess methyl isobutyl ketone was distilled off. Analysis indicated the resulting product was made up of about 95% of N,N'-di(4-methyl-2-pentylidene) diethylene triamine and about 5% of a mixed imine wherein the methyl isobutyl ketone is attached through an imine linkage at one terminal nitrogen atom and an unsaturated ketone resulting from dimerization in the reaction of methyl isobutyl ketone is attached through an imine linkage at the other terminal nitrogen. The resulting bottoms product had a viscosity of 2 to 5 centipoises at 25° C., a flash point of 172° F. and an equivalent weight of 55. This product will be referred to as Ketimine B.

As evident from the above, the products resulting from the reaction of a large excess of ketones or aldehydes, e.g., 3 to 10 moles excess and the polyamines contain a mixed imine wherein the original ketone is attached through an imine linkage at one nitrogen atom and an unsaturated long chain ketone resulting from polymerization of the ketone reactant is attached through an imine linkage at the other terminal nitrogen. The amount of the mixed imine will generally vary from about 1% to 30% depending on the strength of the polyamine, stronger amines resulting in more formation of the mixed imine.

The above-noted crude mixtures of the ketimines are particularly suited for use as curing agents as they give both a curing and flexibilizing effect to the resulting combination.

The preparation of a polyimine from meta-xylylene diamine and methyl isobutyl ketone is illustrated by the following:

PREPARATION OF N,N-DI(4-METHYL-2-PENTYLIDENE) m-XYLYLENE DIAMINE 73 parts of meta-xylylene diamine was combined with 110 parts of methyl isobutyl ketone and 100 parts of benzene. The mixture was refluxed under phase separator. The benzene that separated was returned back to the reactor and the water separated was removed. When the theoretical amount of water had been recovered, the reaction was stopped. The mixture was then distilled and fractionated to yield relatively pure N,N-di(4-methyl-2-pentylidene) m-xylylene diamine having a boiling range of 180–188° C. (1 mm. Hg).

By following the above procedures, other ketimines as shown in Table I may be prepared.

TABLE 1.—KETIMINES

| | Ketone[1] | Amine[2] | Conversion Crude, Percent | Conversion Distilled, Percent | Boiling Point of Ketimine °C | Boiling Point of Ketimine mm. Hg | Analysis of Ketimine Crude C | Crude H | Crude N | Distilled C | Distilled H | Distilled N | Theory C | Theory H | Theory N |
|---|---|---|---|---|---|---|---|---|---|---|---|---|---|---|---|
| 1 | DMK | EDA | | 60 | 44-46 | 1.0 | | | | 68.2 | 11.5 | 19.5 | 68.5 | 11.4 | 20.0 |
| 2 | DMK | PDA | | 39 | 30-40 | 10 | | | | 69.2 | 11.8 | 18.1 | 70.1 | 11.8 | 18.2 |
| 3 | DMK | DTA | | 84 | 75 | 1.0 | | | | 65.3 | 11.6 | 23.0 | 65.6 | 11.5 | 23.0 |
| 4 | MEK | EDA | 77 | | | | 71.3 | 12.0 | 16.6 | | | | 71.5 | 11.9 | 16.7 |
| 5 | MEK | PDA | | 38 | 91-95 | 10 | | | | 70.6 | 12.1 | 16.1 | 73.3 | 11.2 | 15.5 |
| 6 | MEK | DAPOL | 97 | 95 | 81-88 | 0.5 | | | | 65.6 | 11.2 | 14.6 | 66.6 | 11.2 | 14.1 |
| 7 | MEK | DTA | | 89 | 100-104 | 0.5 | | | | 67.2 | 11.9 | 20.4 | 68.2 | 11.9 | 19.9 |
| 8 | MEK | DADPA | 99 | 85.5 | 115-122 | 1.0 | | | | 69.8 | 12.3 | 17.6 | 70.2 | 12.2 | 17.5 |
| 9 | MIBK | EDA | 99 | 47.5 | 91-92 | 1.0 | 75.2 | 12.5 | 12.1 | 73.9 | 12.6 | 13.4 | 74.9 | 12.6 | 12.5 |
| 10 | MIBK | PDA | 89 | | | | 75.4 | 12.7 | 11.9 | | | | 75.6 | 12.6 | 11.8 |
| 11 | MIBK | TMDA | | 70 | 135 | 3.0 | | | | 76.0 | 12.8 | 10.8 | 76.1 | 12.8 | 11.1 |
| 12 | MIBK | HMDA | 90 | 75 | 140 | 0.4 | 77.2 | 12.9 | 9.8 | 77.1 | 12.9 | 10.1 | 77.0 | 12.9 | 10.0 |
| 13 | MIBK | MXDA | | 87.5 | 180 | 1.0 | | | | 80.0 | 10.9 | 9.3 | 79.9 | 10.7 | 9.3 |
| 14 | MIBK | DTA | 94 | 86.5 | 138 | 1.0 | | | | 71.6 | 12.4 | 15.9 | 71.8 | 12.4 | 15.7 |
| 15 | MIBK | TETA | 100 | | | | 67.4 | 12.2 | 17.0 | | | | 69.6 | 12.3 | 18.0 |
| 16 | MIBK | TEPA | | 98 | 215-220 | 1.0 | | | | 68.8 | 12.0 | 18.4 | 67.9 | 12.3 | 19.8 |
| 17 | MIBK | Polyamide | 92 | | | | 74.3 | 12.5 | 10.4 | | | | 74.6 | 12.5 | 9.3 |
| 18 | DIBK | EDA | 64 | | | | 77.8 | 13.0 | 9.1 | | | | 77.0 | 14.1 | 8.9 |
| 19 | DIBK | MXDA | | 75 | 200 | 0.8 | | | | 81.2 | 11.5 | 7.3 | 81.2 | 11.5 | 7.3 |
| 20 | EAK | EDA | 71 | | | | 76.7 | 12.9 | 10.1 | | | | 77.2 | 12.8 | 10.0 |
| 21 | EAK | PDA | 63.3 | | | | 77.2 | 13.0 | 9.9 | | | | 77.5 | 12.9 | 9.5 |
| 22 | EAK | DTA | 92.5 | | | | 72.5 | 12.7 | 13.6 | | | | 74.4 | 12.7 | 13.0 |
| 23 | CYCLO | MXDA | | 78 | 150 | 0.003 | | | | 81.2 | 9.5 | 9.4 | 81.0 | 9.5 | 9.4 |
| 24 | CYCLO | DTA | | 83 | 190 | 1.5 | | | | 72.6 | 11.0 | 15.7 | 72.9 | 11.1 | 15.9 |
| 25 | MPK | EDA | 95 | [3] 80 | [4] 114-116 | | 81.8 | 7.6 | 10.6 | 81.9 | 7.7 | 10.8 | 81.8 | 7.6 | 10.6 |
| 26 | MPK | PDA | 100 | | | | 82.1 | 7.9 | 9.6 | | | | 82.0 | 7.9 | 9.6 |
| 27 | MPK | MXDA | 97 | | | | 84.6 | 7.0 | 8.2 | | | | 84.8 | 7.1 | 8.2 |
| 28 | MPK | DTA | 98 | | | | 78.1 | 8.2 | 13.2 | | | | 78.1 | 8.1 | 13.7 |

[1] DMK=Acetone; MEK=Methyl Ethyl Ketone; MIBK=Methyl Isobutyl Ketone; DIBK=Diisobutyl Ketone; EAK=Ethyl Amyl Ketone; CYCLO=Cyclohexanone; MPK=Acetophenone.
[2] EDA=Ethylene Diamine; PDA=Propylene Diamine; DTA=Diethylene Triamine; DAPOL=1,3-Diamino-2-Propanol; DADPA=3,3-Diaminodipropyl Amine; TMDA=Tetramethylene Diamine; HMDA=Hexamethylene Diamine; MXDA=Metaxylylene Diamine; TETA=Triethylene Tetramine; TEPA=Tetraethylene Pentamine; Polyamide=Amino-terminated polyamide of diethylene triamine and dimerized linoleic acid.
[3] Crystallized once.
[4] Melting point.

According to the process of the invention, one or more of the above-described polyimines are combined with the polyepoxide. In order to avoid rapid cure of the mixture, the components should be relatively free of moisture and the mixing and storage should be done in a moisture free container and in the presence of a relatively moisture free atmosphere.

The polyepoxides and polyimines can be combined in a variety of proportions depending on the type of products desired. Smaller or larger amounts of reactants than the curing amounts will give longer chain soluble products which can be further reacted. The use of curing amounts, on the other hand, give the desired infusible insoluble products. To obtain the desired cure, it is generally preferred to combine the polyepoxide with at least .6 equivalent of the polyimine. Equivalent amounts of the polyimine include any available amino hydrogen and the —C=N— groups, each —C=N— group being equal to two equivalents as it is converted to a primary amino group. As used herein, equivalent amount means that amount of polyimine needed to furnish one amino hydrogen or potentially amino hydrogen per epoxy group. Preferably the polyepoxide and polyimine are combined in chemical equivalent ratios varying from .6:1 to 1.5:1.

In executing the process of the invention, it is sometimes desirable to have the polyepoxide in a mobile liquid condition when the imine is added so as to facilitate thorough mixing. The polyepoxides as described below are generally viscous to solid materials at ordinary temperature. With those that are liquid, but too viscous for readily mixing, they are either heated to reduce the viscosity or have a liquid solvent added thereto in order to provide fluidity. Normally solid members are likewise either melted or mixed with a liquid solvent. Various solvents are suitable for achieving fluidity of the polyepoxides. These may be volatile solvents which escape from the polyether compositions containing the imine by evaporation before or during the curing such as ketones like acetone, methyl ethyl ketone, methyl isobutyl ketone, isophorone, etc. esters such as ethyl acetate, butyl acetate. Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The above-described polyimines which are prepared from polyamines having more than two amino groups, such as, for example, diethylene triamine, will possess active amino hydrogen and may be regarded as reactive ketimines in that they tend to cause a slight thickening of the mixture when combined with the polyepoxide. They still, however, possess the latent curing activity. Such reactive ketimines may be combined in various proportions with those polyimines, such as derived from polyamines containing only two primary amino hydrogen, such as ethylene diamine, to improve the activity thereof. Preferred proportions vary from about .1% to 40% of the reactive polyimine to 99.9% to 60% of the pure polyimine.

The activity of the cure may be increased by the addition of accelerators, such as, for example, small amounts of water, phenol, aliphatic polyamines, mercaptans, acids and the like. Preferred amounts of water vary from about 0.5 to 3% based on the polyimine used; preferred amounts of phenol vary from 1% to 5% based on the polyepoxide; and preferred amounts of the aliphatic polyamines vary from about 0.5 to 3% based on the polyimine curing agent.

The imines may also be used in combination with other curing agents, such as aromatic polyamines, anhydrides, BF₃-amine complexes, metal salts and the like, particularly when long storage periods are not required.

The cure of the above-described mixture is effected by exposing the mixture to moisture, and preferably a moist atmosphere. The rate of cure up to a certain point will increase with the increased moisture content. In most cases, it is preferred to employ an atmosphere having at least 20% relative humidity, and still more preferably a relative humidity of 30% to 90%.

The temperature employed during the cure may vary over a wide range. Satisfactory rates are obtained at room temperature or lower, but generally preferred to apply some heat to accelerate the cure. Temperatures ranging from about 15° C. to about 150° C. have proved very satisfactory.

An important use of the process of the invention is in the preparation of coating and surfacing compositions. In this application, the polyepoxide, special latent curing agent and other desired resinous materials, plasticizers, flexibilizers, stabilizers and the like are combined together and the mixture applied to the desired surface, such as concrete, asphalt, metal, plaster, stone, wood, and the like, by conventional procedure, such as brushing, dipping, spraying and the like, and then the coating is allowed to remain in a moist atmosphere until it had set hard. As noted above, heat may be applied to accelerate the cure.

The polyimines are particularly useful in high solids or solvent-free coatings containing liquid polyepoxides. Using conventional amine curing agents, the pot life of this type of coating is so short that it cannot be applied with conventional spray equipment. However, with the polyimines of the present invention, it is possible to formulate solvent free polyepoxide resin coatings having a usable pot life of many hours. Under favorable application conditions, e.g., temperatures greater than 60° F. and relative humidity above 30%, a practical rate of cure is obtained in spray-applied films considerably greater than ten mils thickness.

Another important application of the process of the invention is in the production of laminates or resinous articles reinforced with fibrous textiles. Although it is generally preferred to utilize glass cloth for this purpose, any of the other suitable materials in sheet form may be employed such as glass matting, paper, asbestos paper, mica flakes, cotton bats, duck muslin, canvas, and the like.

In preparing the laminate, the sheets of fibrous material are first impregnated with the mixture of polyepoxide, latent curing agent. This is accomplished by dissolving the material in a solvent such as acetone and the sheets then impregnated with this solution and exposed to moisture to effect a partial cure of the material. The resulting sheets are then superimposed and cured together under heat and pressure according to conventional techniques.

The polyepoxides to be used in the process of the invention include those organic compounds containing a plurality of epoxy groups, i.e.,

groups. These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type have been defined in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

A group of polyepoxide which are not specifically illustrated in the above patent but are of particular value in the process of the invention are the glycidyl ethers of novalac resins which resins are obtained by condensing an aldehyde with a polyhydric phenol. A typical member of this class is the epoxy resin from formaldehyde 2,2-bis-(5-hydroxyphenyl)-propane novalac resin which contains as predominant constituent the substance represented by the formula

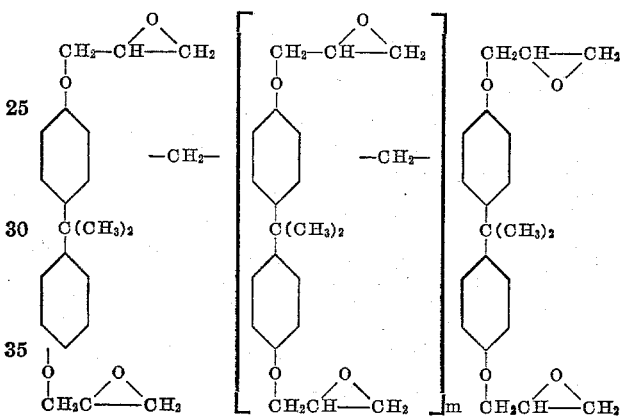

Another group of preferred polyepoxides comprises the glycidyl ethers of alpha,alpha,omega,omega-tetrakis (hydroxyaryl)alkanes as described and claimed in Schwarzer, Serial No. 466,208, filed November 1, 1954.

Other examples include epoxidized esters of polyethylenically unsaturated monocarboxylic acids, such as epoxidized linseed, soybean, perilla, oiticia, tung, walnut and dehydrated castor oil, methyllinoleate, butyl linoleate, ethyl 9,12-octadecadienoate, butyl 9,12,15-octadecatrienoate, butyl oleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,4-epoxybutyl) citrate, and di(4,5-epoxyoctadecyl) malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl, 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13 - diepoxyeiconsanecioate, dibutyl 7,8,11,12-diepoxyoctadecanedioate, dioctyl 10,11-diethyl-8,9,12,13 - diepoxy - eiconsanedioate, dihexyl, 6,7,10,11-diepoxyhexadecanedioate, didecyl 9-epoxy-ethyl - 10,11-epoxyoctadecenedioate, dibutyl 3-butyl-3,4,5,6-diepoxycyclohexane-1,2 - dicarboxylate, dicyclohexyl 3,4,5,6 - diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

To illustrate the manner in which the invention may be carried out, the following examples are given. It should be understood, however, that the examples are for the purpose of illustration and the invention is not to be regarded as limited to any of the specific materials or conditions recited therein. Unless otherwise indicated, parts recited in the examples are parts by weight.

Polyethers A, B and C referred to herein are those described in U.S. 2,633,458.

The XA–200 composition referred to in the examples is made up of 100 parts of Polyether C, 44 parts of methylisobutyl ketone, 44 parts of Cellosolve, 45 parts of xylene, and 2 parts of a polysiloxane.

*Example I*

This example illustrates the use of the polyimine obtained by reacting a xylylene diamine with methylisobutyl ketone as a latent curing agent for polyepoxide compositions.

100 parts of the above-described XA–200 composition and 9 parts of the above-described polyimine were mixed together and kept in a closed vessel for several days. When the vessel was opened there was no indication of any cure having taken place.

The above-described mixture of the XA–200 composition and the polyimine was spread out as a thin film and placed in a room wherein the relative humidity was approximately 50%. The films were tack free in one and a quarter hours and cotton free in three hours. In 12 hours the films were very hard and tough.

About 100 parts of Polyether A was combined with 39 parts of the above-described imine and the mixture stored in a closed container for several days. No cure was apparent. However, when the above mixture was spread out as a thin film and placed in the 50% relative humidity room, the films cured in a few hours to form a hard tough coat.

*Example II*

(A) This example illustrates the use of a relatively pure polyimine obtained from diethylene triamine and methylisobutyl ketone having a boiling point of about 127 to 130° C. (1 mm. Hg) as a latent curing agent for polyepoxide compositions.

100 parts of the XA–200 composition and 6.5 parts of the above-described polyimine were mixed together and placed in a closed vessel. No cure was apparent after several days storage.

The above mixture was then spread out as a thin film on steel panels and placed in a room having 50% relative humidity. The coating was tack free in an hour and a quarter and cotton free in about three hours. After about 12 hours the film was very hard and tough.

About 100 parts of Polyether A was combined with 28 parts of the above-described polyimine and the mixture was stored in a closed container. No cure was evident after several days storage. When the mixture was spread out as a thin film and placed in a 50% relative humidity room, the coating cured to form a hard tough film.

(B) The procedure in (A) above was repeated with the exception that the ketimine was replaced with the crude product Ketimine A prepared as above. In this case some latent curing properties were obtained and the ketimine acted both as a curing agent and plasticizer.

*Example III*

(A) This example illustrates the use of a relatively pure polyimine obtained from ethylene diamine and methyl isobutyl ketone having a boiling point between 80 and 84° C. (1 mm. Hg) as a latent curing agent for polyepoxide compositions.

100 parts of the XA–200 composition and 6.7 parts of the above-described polyimine were mixed together and placed in a closed container. No cure took place after several days storage.

The above mixture is then spread out as a thin film on glass plates and placed in a room having approximately 50% relative humidity. In a few hours the coating had cured to form a hard tough film.

100 parts of Polyether A was combined with 29 parts of the polyimine and the mixture stored in a closed container. After several days storage no cure had taken place. The above mixture was then spread out as a thin film and placed in a 50% relative humidity room. In a few hours the coating cured to form a hard tough film.

(B) The procedure in (A) above was repeated with the exception that the ketimine was replaced with Ketimine B prepared as noted above. In this case, the same latent curing properties were obtained and the ketimine acted both as a curing agent and as a plasticizer.

*Example IV*

This example illustrates the use of a polyimine obtained from methylethyl ketone and diethylene triamine having a boiling point of about 100–104° C. (1 mm. Hg) to cure polyepoxide compositions. 100 parts of Polyether A was combined with 22 parts of the above-described polyimine and the mixture stored in a closed container. After several days storage, no cure had taken place. The above mixture is then spread out as a thin film and placed in a 50% relative humidity room. In a few hours the coating had cured to form a hard tough film.

*Example V*

This example illustrates the use of a polyimine obtained from diisobutyl ketone and xylylene diamine having a boiling point of 200–210° C. (1 mm. Hg) as a latent curing agent for Polyether A.

100 parts of Polyether A and 34 parts of the above-described polyimine were mixed together and placed in a closed container. After several days storage no cure had taken place. The above mixture is then spread out as a thin film and placed in a 50% relative humidity room. In a few hours the coating had cured to form a hard tough film.

*Example VI*

This example illustrates the use of a polyimine obtained from tetramethylene diamine and methylisobutyl ketone having a boiling point between 130 and 135° C. (1 mm. Hg) as a curing agent for Polyether A.

100 parts of Polyether A and 33 parts of the above-described polyimine were mixed together and stored in a closed container. After several days no cure had taken place. The above mixture is then spread out as a thin film and placed in a 50% relative humidity room. In a few hours the coating cured to form a hard tough film.

*Example VII*

This example illustrates the use of a polyimine obtained from methyl levulinate and diethylene triamine having a boiling point of 110–120° C. (1 mm. Hg) as a curing agent for Polyether A.

100 parts of Polyether A and 32 parts of the above-described polyimine were mixed together and placed in a closed container. After several days no cure had taken place. The above mixture was then spread out as a thin film and placed in a 50% relative humidity room. In a few hours the coating set up to form a hard tough film.

*Example VIII*

Examples I to VII are repeated with the exception that the polyepoxide composition is epoxidized tetrahydrobenzyl tetrahydrobenzoate.

*Example IX*

Examples I to VII are repeated with the exception that the polyepoxide composition is a glycidyl ether of glycerol and a diglycidyl ether of resorcinol. Related results are obtained.

*Example X*

Example I was repeated with the exception that the curing agent employed in chemical equivalent amounts was the ketimine from ethylene diamine and acetone. Related results are obtained.

*Example XI*

Example I was repeated with the exception that the curing agent employed in chemical equivalent amounts was the ketimine from propylene diamine and acetone. Related results are obtained.

*Example XII*

Example I was repeated with the exception that the curing agent employed in chemical equivalent amounts was the ketimine from diethylene triamine and acetone. Related results are obtained.

*Example XIII*

Example I was repeated with the exception that the curing agent employed in chemical equivalent amounts was each of the following:

Ketimine from ethylene diamine and methyl ethyl ketone
Ketimine from propylene diamine and methyl ethyl ketone
Ketimine from 1,3-diamino-2-propanol and methyl ethyl ketone
Ketimine from 3,3-diaminodipropyl amine and methyl ethyl ketone
Ketimine from ethylene diamine and methyl isobutyl ketone
Ketimine from tetramethylene diamine and methyl isobutyl ketone
Ketimine from hexamethylene diamine and methyl isobutyl ketone
Ketimine from triethylene tetramine and methyl isobutyl ketone
Ketimine from tetraethylene pentamine and methyl isobutyl ketone
Ketimine from a polyamide of ethylene diamine and dimerized linoleic acid and methyl isobutyl ketone
Ketimine from ethylene diamine and diisobutyl ketone
Ketimine from ethylene diamine and ethyl amyl ketone
Ketimine from propylene diamine and ethyl amyl ketone
Ketimine from diethylene triamine and ethyl amyl ketone
Ketimine from cyclohexane and metaxylylene diamine
Ketimine from cyclohexane and diethylene triamine
Ketimine from acetophenone and ethylene diamine
Ketimine from acetophenone and propylene diamine
Ketimine from acetophenone and metaxylylene diamine
Ketimine from acetophenone and diethylene triamine.

Related results are obtained in each case.

*Example XIV*

Example XIII is repeated with the exception that the polyepoxide is replaced with an equivalent amount of each of the following:

Polyether A
Polyether A plus 5% phenyl glycidyl ether
Polyether A plus 5% butyl glycidyl ether
Polyether B
Polyether D Related results are obtained.

*Example XV*

Example I is repeated with the exception that the polyimine employed is as follows:

Ketimine from diethylene triamine and butyl levulinate
Ketimine from diethylene triamine and methoxybutyl amyl ketone
Ketimine from diethylene triamine and hydroxybutyl amyl ketone
Ketimine from diethylene triamine and chlorobutyl hexyl ketone Related results are obtained.

*Example XVI*

Example I is repeated with the exception that the polyimine employed is as follows:

Ketimine from methyl isobutyl ketone and an amino-containing polyamide of dimerized linoleic acid hexamethylene diamine
Ketimine from ethyl isobutyl ketone and an amino-containing polyurethane from toluene diisocyanate and hexamethylene diamine
Ketimine from methyl isobutyl ketone and an amino-containing polyester from ethanolamine and dimerized linoleic acid.

Related results are obtained.

*Example XVII*

Example I is repeated with the exception that the polyimine employed is as follows:

Ketimine from methyl isobutyl ketone and 4-thiahexane-1,6-diamine
Ketimine from methyl octyl ketone and 4,6-dithiadecane-1,10-diamine
Ketimine from methyl ethyl ketone and 4-oxahexane-1,6-diamine.

Related results are obtained.

*Example XVIII*

Example I is repeated with the exception that one was a 50–50 mixture of a ketimine of ethylene diamine and methyl isobutyl ketone and a ketimine of diethylene triamine and methyl isobutyl ketone. The mixture cured at a faster rate than with the ethylene diamine-ketone product by itself.

*Example XIX*

Examples I to X are repeated with the exception that 2% of each of the following phenols is added to the resulting mixture to accelerate cure: phenol, 2,2-bis(4-hydroxyphenyl)propane, resorcinol and tert-butylphenol. In each case, the cured product was obtained in a shorter period than without the accelerator.

*Example XX*

Example I is repeated with the exception that the polyimine used as the curing agent is as follows:

Ketimine from methyl octyl ketone and

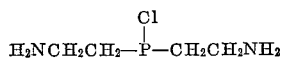

Ketimine from diamyl ketone and

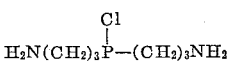

Related results are obtained in each case.

*Example XXI*

Example I is repeated with the exception that the polyimine used as the curing agent is as follows:

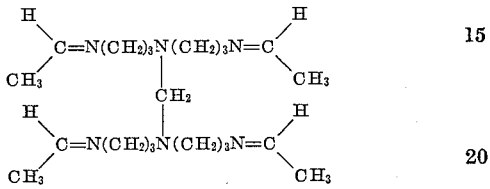

A rapid cure is obtained.

*Example XXII*

Example I is repeated with the exception that the polyimine used is as follows:

Polyimine from butyl amine and glutaraldehyde
Polyimine from octyl amine and 1,4-cyclohexanedicarboxaldehyde
Polyimine from phenyl amine and glutaraldehyde
Polyimine from cyclohexyl amine and 1,8-octanedicarboxaldehyde.

Related results are obtained.

I claim as my invention:

1. A process for curing polyepoxides having a plurality of vic-epoxy groups which comprises mixing the polyepoxide with a polyimine of the formula

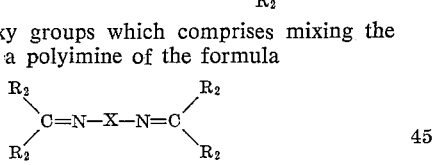

wherein $R_2$ is a member of the group consisting of hydrogen, open-chain hydrocarbon radicals and six-membered cyclic hydrocarbon radicals including those cyclic radicals formed by joining together two of the $R_2$ radicals which are attached to the same carbon atom, carboxy-substituted hydrocarbon radicals, carbalkoxy-substituted hydrocarbon radicals, hydroxy-substituted hydrocarbon radicals, alkoxy-substituted hydrocarbon radicals and halogen-substituted hydrocarbon radicals and X contains less than 14 carbon atoms and is a member of the group consisting of hydrocarbon radicals, oxygen-containing hydrocarbon radicals, sulfur-containing hydrocarbon radicals, nitrogen-containing hydrocarbon radicals, phosphorous-containing hydrocarbon radicals and halogen-containing hydrocarbon radicals, and exposing the resulting mixture to an atmosphere having at least 20% relative humidity.

2. A process for curing polyepoxides having a plurality of vic-epoxy groups which comprise mixing the polyepoxide with a polyimine of the group consisting of:

(1) compounds of the formula

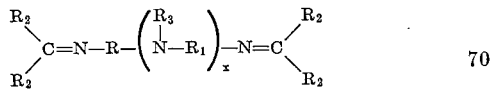

wherein $x$ is an integer including 0, R and $R_1$ are bivalent hydrocarbon radicals, $R_2$ is a member of the group consisting of hydrogen, open-chain hydrocarbon radicals and six-membered cyclic hydrocarbon radicals including those cyclic radicals formed by joining together two of the $R_2$ radicals which are attached to the same carbon atom, carboxy-substituted hydrocarbon radicals, carbalkoxy-substituted radicals, hydroxy-substituted hydrocarbon radicals, alkoxy-substituted hydrocarbon radicals and halogen-substituted hydrocarbon radicals and $R_3$ is a member of the group consisting of hydrogen, hydrocarbon radicals and

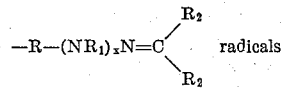

(2) compounds of the formula

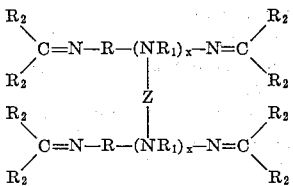

wherein $x$ is an integer of at least 1, Z is a bivalent hydrocarbon radical, and R, $R_1$ and $R_2$ are as described in (1) above, (3) compounds of the formula

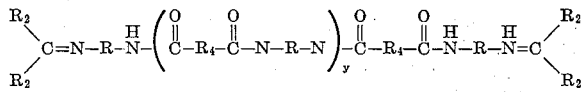

wherein $y$ is an integer including 0, $R_4$ is the residue of a polycarboxylic acid by removing the two carboxyl groups, R and $R_2$ being as described in (1) above, (4) compounds of the formula

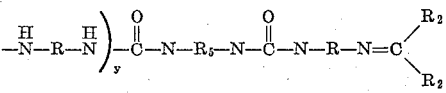

wherein $y$ is an integer including 0, $R_5$ is the residue of a polyisocyanate obtained by removing the two isocyanate groups, R and $R_2$ are as described in (1) above, (5) compounds of the formula

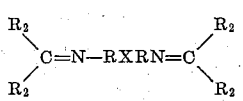

wherein X is a member of the group consisting of oxygen, sulfur and phosphorous, and R and $R_2$ are as described above, (6) compounds of the formula

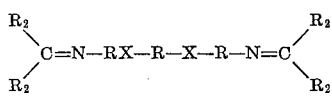

wherein X is a member of the group consisting of oxygen, sulfur and phosphorous, and R and $R_2$ are as described above, (7) compounds of the formula

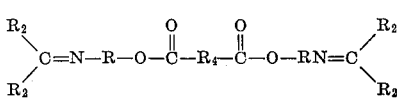

wherein R, $R_2$ and $R_4$ are as described above, and exposing the resulting mixture to an atmosphere of at least 20% relative humidity.

3. A process as in claim 2 wherein the polyepoxide is a glycidyl polyether of 2,2-bis(4-hydroxyphenyl)propane having an epoxy equivalency greater than 1.1.

4. A process as in claim 2 wherein the polyimine is employed in at least 0.6 equivalent proportions as compared to the polyepoxide.

5. A process for curing polyepoxides having a plurality of vic-epoxy groups which comprises mixing the polyepoxide with a polyimine of the formula

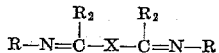

wherein $R_2$ is a member of the group consisting of hydrogen and hydrocarbon radicals, R is a hydrocarbon radical and X contains less than 14 carbon atoms and is a member of the group consisting of hydrocarbon radicals, oxygen-containing hydrocarbon radicals, sulfur-containing hydrocarbon radicals, nitrogen-containing hydrocarbon radicals, phosphorous-containing hydrocarbon radicals and halogen-containing hydrocarbon radicals, and exposing the resulting mixture to an atmosphere of at least 30% relative humidity.

6. A process for curing polyepoxides having a plurality of vic-epoxy groups which comprises mixing the polyepoxide with a polyimine of the formula

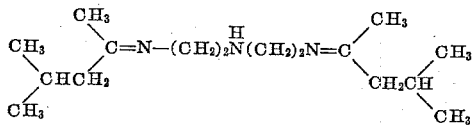

and exposing the resulting mixture to an atmosphere of at least 30% relative humidity.

7. A process for curing polyepoxides having a plurality of vic-epoxy groups which comprises mixing the polyepoxide with a polyimine of the formula

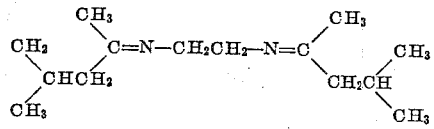

and exposing the resulting mixture to an atmosphere of at least 30% relative humidity.

8. A process for curing polyepoxides as in claim 1 wherein the reaction mixture contains a phenol accelerator.

9. A process for curing polyepoxides as in claim 1 wherein the reaction mixture also contains a polyamine accelerator.

10. A process for curing polyepoxides having a plurality of vic-epoxy groups which comprises mixing the polyepoxide with a mixture of a ketimine of ethylene diamine and methyl isobutyl ketone and a ketimine of diethylene triamine and methyl isobutyl ketone, and exposing the resulting mixture to an atmosphere having at least 20% relative humidity.

11. A process for curing polyepoxides having a plurality of vic-epoxy groups which comprises mixing the polyepoxide with N,N-di(4-methyl-2-pentylidene)m-xylylene diamine, and exposing the resulting mixture to an atmosphere of at least 20% relative humidity.

12. A process for curing polyepoxides having a plurality of vic-epoxy groups which comprises mixing the polyepoxide with a polyimine of the formula

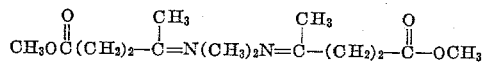

and exposing the resulting mixture to an atmosphere of at least 20% relative humidity.

13. A process for curing polyepoxides having a plurality of vic-epoxy groups which comprises mixing the polyepoxide with a polyimine of the formula

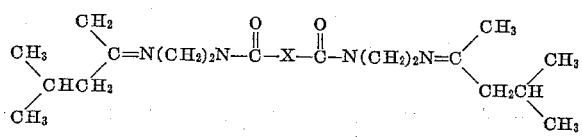

and exposing the resulting mixture to an atmosphere of at least 20% relative humidity.

14. A process for curing polyepoxides as in claim 1 wherein the polyepoxide is a glycidyl polyether of a polyhydric compound of the group consisting of polyhydric phenols and polyhydric alcohols.

References Cited by the Examiner

UNITED STATES PATENTS

| | | | |
|---|---|---|---|
| 2,136,928 | 11/1938 | Schlack | 260—47 |
| 2,422,013 | 6/1947 | Haury et al. | 260—566 |
| 2,703,333 | 3/1955 | Rowlands | 260—566 |
| 2,729,679 | 1/1956 | Anderson | 260—566 |
| 2,893,973 | 7/1959 | Steckler et al. | 260—47 |
| 2,897,179 | 7/1959 | Shechter et al. | 260—47 |
| 2,994,685 | 8/1961 | Delmonte | 260—47 |

FOREIGN PATENTS 1,010,677  6/1957  Germany.

WILLIAM H. SHORT, *Primary Examiner.*

LOUISE P. QUAST, *Examiner.*

T. D. KERWIN, A. LIBERMAN, *Assistant Examiners.*